United States Patent
Carlson et al.

(10) Patent No.: US 6,665,332 B1
(45) Date of Patent: Dec. 16, 2003

(54) CDMA GEOLOCATION SYSTEM

(75) Inventors: John P. Carlson, Herndon, VA (US); Thomas B. Gravely, Herndon, VA (US); Mark C. Sullivan, Annadale, VA (US)

(73) Assignee: Allen Telecom, Inc., Beachwood, OH (US)

(*) Notice: Subject to any disclaimer, the term of this patent is extended or adjusted under 35 U.S.C. 154(b) by 0 days.

(21) Appl. No.: 09/392,965

(22) Filed: Sep. 9, 1999

Related U.S. Application Data

(60) Provisional application No. 60/099,543, filed on Sep. 9, 1998.

(51) Int. Cl.[7] .......................... H04B 1/713; H04M 11/00
(52) U.S. Cl. ........................................ 375/130; 455/456
(58) Field of Search ................................ 375/356, 133, 375/267; 455/435, 456; 370/503, 320, 335, 280, 336; 342/357, 363, 457

(56) References Cited

U.S. PATENT DOCUMENTS

| | | | |
|---|---|---|---|
| 5,228,056 A | 7/1993 | Schilling | |
| 5,293,645 A | 3/1994 | Sood | |
| 5,351,269 A | 9/1994 | Schilling | |
| 5,365,544 A | 11/1994 | Schilling | |
| 5,410,538 A | 4/1995 | Roche | |
| 5,506,864 A | 4/1996 | Schilling | |
| 5,508,708 A | 4/1996 | Ghosh et al. | |
| 5,548,583 A | 8/1996 | Bustamante | |
| 5,614,914 A | 3/1997 | Bolgiano | |
| 5,619,211 A | 4/1997 | Horkin | |
| 5,675,344 A | 10/1997 | Tong | |
| 5,736,964 A | 4/1998 | Ghosh | |
| 5,752,218 A | 5/1998 | Harrison | |
| 5,999,131 A | * 12/1999 | Sullivan | 342/465 |
| 6,021,330 A | * 2/2000 | Vannucci | 455/456 |
| 6,163,696 A | * 12/2000 | Bi et al. | 455/436 |
| 6,233,459 B1 | * 5/2001 | Sullivan et al. | 455/456 |
| 6,252,861 B1 | * 6/2001 | Bernstein et al. | 370/331 |
| 6,414,634 B1 | * 7/2002 | Tekinay | 342/453 |

OTHER PUBLICATIONS

Don J. Torrieri, "Statistical Theory of Passive Locations Systems,", Mar. 1984, pp. 183–198, IEEE Transactions on Aerospace and Electronic Systems vol. AES–20, No. 2, IEEE, USA.

* cited by examiner

*Primary Examiner*—Stephen Chin
*Assistant Examiner*—Edith Yeh
(74) *Attorney, Agent, or Firm*—Michael, Best & Friedrich LLC

(57) ABSTRACT

A geolocation system for geolocating a mobile transceiver operating in a CDMA communication system is disclosed having improved time of arrival extraction which allows the extracting of time of arrival information of weak CDMA emissions. The improved time of arrival extraction is accomplished by breaking the received CDMA emission into M identical processing stages. Each stage performs despreading/demodulating at over sampled chip offsets from the next processing stage. The P-point fast Fourier transform of the M stages is taken and in effect a two dimensional time versus frequency cross ambiguity function is created. The peak of the function may be interpolated to create an accurate estimate of the time of arrival of the emission from the mobile transceiver, thus improving the accuracy of time of arrival measurements and adjusting for doppler frequency shifts that may otherwise corrupt the measurements when integrating over a long period of time.

32 Claims, 5 Drawing Sheets

CDMA GEOLOCATION SYSTEM

This is a formal application which replaces provisional application No. 60/099,543, filed on Sep. 9, 1998.

FIELD OF THE INVENTION

The present invention relates to mobile radio geolocation systems. More particularly, the present invention relates to CDMA geolocation systems capable of determining the location of a mobile CDMA transceiver operating in a CDMA communication system.

BACKGROUND OF THE INVENTION

Mobile radio communication systems are well known in the art. Such systems typically use a plurality of base stations for broadcasting signals to, and maintaining voice or data communications with, mobile radio equipment. Most such mobile radio equipment, which usually are actually transceivers in that they are typically enabled to both broadcast and receive, are individually identified by a code or call number. Once turned on, each radio transmits an identifying signal that includes the code or call number so that the radio may be contacted if a call is directed to it. That is, the user of the radio does not have to be actively engaged in communication on the radio for an identifying signal of that radio to be received by the base stations.

Over time, it has become increasingly apparent that the ability to locate the source of a mobile radio would be advantageous for a variety of reasons. Of paramount importance is the ability to locate an injured person or law enforcement officer in distress. Other advantageous reasons relate to locating the origin or source of an illegally operated mobile radio.

In most mobile radio communication systems there is a high likelihood that the mobile radio signal can be received at multiple dispersed sites, such as dispersed base stations, allowing triangulation through lines of bearing or time difference of arrival (TDOA) hyperbolas. However, certain characteristics of code-division multiple access (CDMA) communication systems present special problems when implementing a geolocation system for determining the location of a mobile CDMA transceiver.

One main difference between CDMA communication systems and other mobile radio communication systems, such as FDMA and TDMA, is the received signal strength of the mobile radio emission at multiple base stations, which is critical for a triangulation-based geolocation system. Conventional communication systems typically use higher transmission power from the mobile radios, thus increasing the chances that the emission will be received and recoverable at multiple base stations. In the CDMA standard, mobile transceiver transmission power is kept at the minimum level required to ensure reliable communication with one base station. This is done in order to maximize the capacity of the CDMA communication system.

As a result of power control in a CDMA communication system, mobile CDMA transceivers are often transmitting at very low power levels. This is especially apparent as they move closer to a base station. Due to what is termed the "near-far" affect, mobile CDMA transceivers close to a base station need only transmit at low power. Those that are far away from a base station need to transmit at higher levels such that all emissions are optimally at equal power when they arrive at the base station.

In terms of the geolocation of CDMA signals, this power control severely limits the applicability of conventional geolocation methods, since mobile CDMA transceiver emissions are often only easily recoverable at one base station. Thus, new techniques for receiving mobile CDMA transceiver emissions at multiple base stations are needed in order to use conventional triangulation techniques for systems utilizing emerging CDMA air standards such as IS-95.

Unlike the air standards applicable to FDMA and TDMA systems, IS-95 allows multiple users to share a common frequency spectrum simultaneously, by assigning each system user a unique spread spectrum spreading code. A spread spectrum system makes use of a sequential noise-like signal structure, for example P.N. (pseudo-noise) codes, to spread the normally narrow band information signal over a relatively wide band of frequencies. The receiver correlates these signals to retrieve the original information signal.

A variety of triangulation-based CDMA geolocation systems have been proposed in U.S. Pat. No. 5,508,708, issued to Ghosh et al, U.S. Pat. No. 5,736,964, issued to Ghosh et al., U.S. Pat. No. 5,675,344, issued to Tong et al., U.S. Pat. No. 5,365,544, issued to Schilling, U.S. Pat. No. 5,506,864, issued to Schilling, and U.S. Pat. No. 5,228,056, issued to Schilling. However, these systems do not address how to overcome the low power characteristic of the received mobile CDMA transceiver emissions without requiring system intervention, such as transmission of special sequences or use of power up functions by the mobile CDMA transceivers. In addition, these systems to not account for frequency offsets between the transmitting and receiving hardware due to tuning error and doppler frequency shifts imposed by transmitter motion. Even slight differences in frequency will render these systems largely ineffective.

Accordingly, it would be advantageous to provide means for geolocating the position of a spread spectrum coded radio frequency emission, such as a CDMA radio signal, which addresses problems resulting from the low power characteristics of received mobile CDMA transceiver emissions without requiring special intervention by the communication system.

SUMMARY OF THE INVENTION

In accordance with the present invention, a CDMA geolocation system capable of determining the location of a mobile CDMA transceiver operating in a CDMA communication system includes at least one mobile transceiver capable of spread spectrum coded radio frequency emissions and communication with a plurality of base stations. Each base station is capable of receiving the spread spectrum coded radio frequency emissions from the mobile transceiver.

The system also includes means for synchronizing the base stations to the mobile transceiver in time and means for determining the geolocation of the mobile transceiver based on times of arrival of the spread spectrum coded radio frequency emission received at the base stations.

Each of the base stations preferably comprises means for identifying information bits of interest from orthogonal sequences of information bits, such as Walsh codes, in the spread spectrum coded radio frequency emission received at the base station and means for determining a time of arrival of the spread spectrum coded radio frequency emission received at base station.

The means for determining the time of arrival of the spread spectrum coded radio frequency emission received at the base station comprises means for dividing the spread spectrum coded radio frequency emission received at the base station into a plurality of stages, despreader/ demodulator means for despreading/demodulating each of the stages into a plurality of Walsh codes, and calculating means for calculating the fast Fourier transform of each of the stages to produce a time-frequency cross ambiguity function. The purpose of which is to compensate for frequency offsets imposed by motion induced doppler frequency shifts, or tuning frequency mismatches between the transmitter and receiver hardware. A means for interpolating a selected peak in the time-frequency cross ambiguity function for determining the time of arrival is desirably also included.

The geolocation system further includes a geolocation control unit for determining a primary base station from the plurality of base stations. The primary base station is the base station in active communication with the mobile transceiver.

The geolocation control system includes means for routing the identified Walsh codes of interest from the primary base station to the secondary base stations, which include all of the base stations except the primary base station. Upon receiving the routed identified Walsh codes of interest, each of the secondary base stations identifies the Walsh codes of interest in the spread spectrum coded radio frequency emission it receives based on the routed identified Walsh codes of interest. The geolocation control system also includes means for instructing each of the base stations to store spread spectrum coded radio frequency emissions received at the base station.

The means for determining time of arrival in each of the secondary base stations comprises despreader/demodulator means for despreading/demodulating each of the stages into Walsh codes at over sampled chip offsets. The means for dividing divides the spread spectrum coded radio frequency emission into M stages wherein:

$$M = \frac{(2d/c)}{Tc} * N$$

Tc=Chip Duration (seconds)
c=speed of light ($3*10^8$ m/s)
d=maximum expected propagation distance (meters)
N=chip over sampling rate The means for identifying a code of interest from the emission received at each base station comprises means for extracting Walsh symbols from the radio frequency emission and means for identifying the Walsh symbol having the largest amplitude.

In one form of the invention, each of the base stations is divided into a plurality of sectors, each sector being capable of receiving spread spectrum coded radio frequency emissions from the mobile transceiver and the geolocation system includes means for determining which sector of each base station receives the spread spectrum coded radio frequency emission. In a form of the invention where the spread spectrum coded radio frequency emission is received by only two base stations, each of the base stations having position coordinates and the first base station is designated the origin, the estimated position of the mobile transceiver is determined as follows:

$$\tilde{y} = \frac{4b\gamma \pm \sqrt{16b^2\gamma^2 + 16(a^2 + b^2)(4a^2r_1^2 - \gamma^2)}}{-8(a^2 + b^2)}$$

$$\tilde{x} = \pm\sqrt{r_1^2 - \tilde{y}^1}$$

$$\gamma = (r_2^2 - r_1^2 - a^2 - b^2)$$

(a,b)=x and y coordinates of second base station (first base station is at the origin)
$(\bar{x},\bar{y})$=estimated position of mobile transceiver
$r_1$=range from first base station
$r_2$=range from second base station The present invention also includes a method of ascertaining the geolocation of a mobile transceiver capable of spread spectrum coded radio frequency emission and which is in communication with a plurality of base stations. The method comprises the steps of receiving spread spectrum coded radio frequency emissions from the mobile transceiver at the plurality of base stations, synchronizing the base stations to the mobile transceiver in time, extracting Walsh codes from a spread spectrum coded radio frequency emissions received at each base stations, determining a primary base station based on the extracted Walsh codes and identifying from the extracted Walsh codes Walsh codes of interest in the spread spectrum coded radio frequency emissions received at the primary base station, forwarding the Walsh codes of interest to the secondary base stations, determining the times of arrival of the spread spectrum coded radio frequency emission received at each of the base stations, and determining the geolocation of the mobile transceiver utilizing the determined times of arrival. The primary base station is the base station in active communication with the mobile transceiver and the secondary base stations comprise all of the base stations except the primary base station.

The step of determining the times of arrival of the spread spectrum coded radio frequency emission received at the secondary base stations further comprises the steps of dividing the received spread spectrum coded radio frequency emission into a plurality of stages, despreading/demodulating each of the stages, into the extracted Walsh codes, calculating the fast Fourier transform of each of the stages to produce a time-frequency cross ambiguity function, and determining the times of arrival of the spread spectrum coded radio frequency emission received at each of the secondary base stations based on said time-frequency cross ambiguity function.

The step of determining the times of arrival of the spread spectrum coded radio frequency emission received at each of the secondary base stations further comprises the step of interpolating a selected peak in the time-frequency cross ambiguity function and determining the times of arrival based on the selected peak.

The step of determining the times of arrival of the identified spread spectrum coded radio frequency emission of interest preferably also includes the step of despreading/demodulating each of the stages into the extracted Walsh codes at over sampled chip offsets for each of the secondary base stations. The step of identifying the Walsh codes of interest further comprises identifying extracted Walsh codes having the largest amplitude.

The step of determining the geolocation of the mobile transceiver may further comprise the steps of determining the range differences from the differences in times of arrival measured at the plurality of base stations, and calculating the geolocation of the mobile transceiver based on these differences. Alternatively, calculating the geolocation of the mobile transceiver may be accomplished using the ranges between the mobile transceiver and the plurality of base stations utilizing the determined times of arrival, and calculating the geolocation of the mobile transceiver based on the ranges between the mobile transceiver and the plurality of base stations.

Further objects, features and advantages of the present invention will become apparent from the following description and drawings.

DETAILED DESCRIPTION OF THE PREFERRED EMBODIMENT

Figure 1:
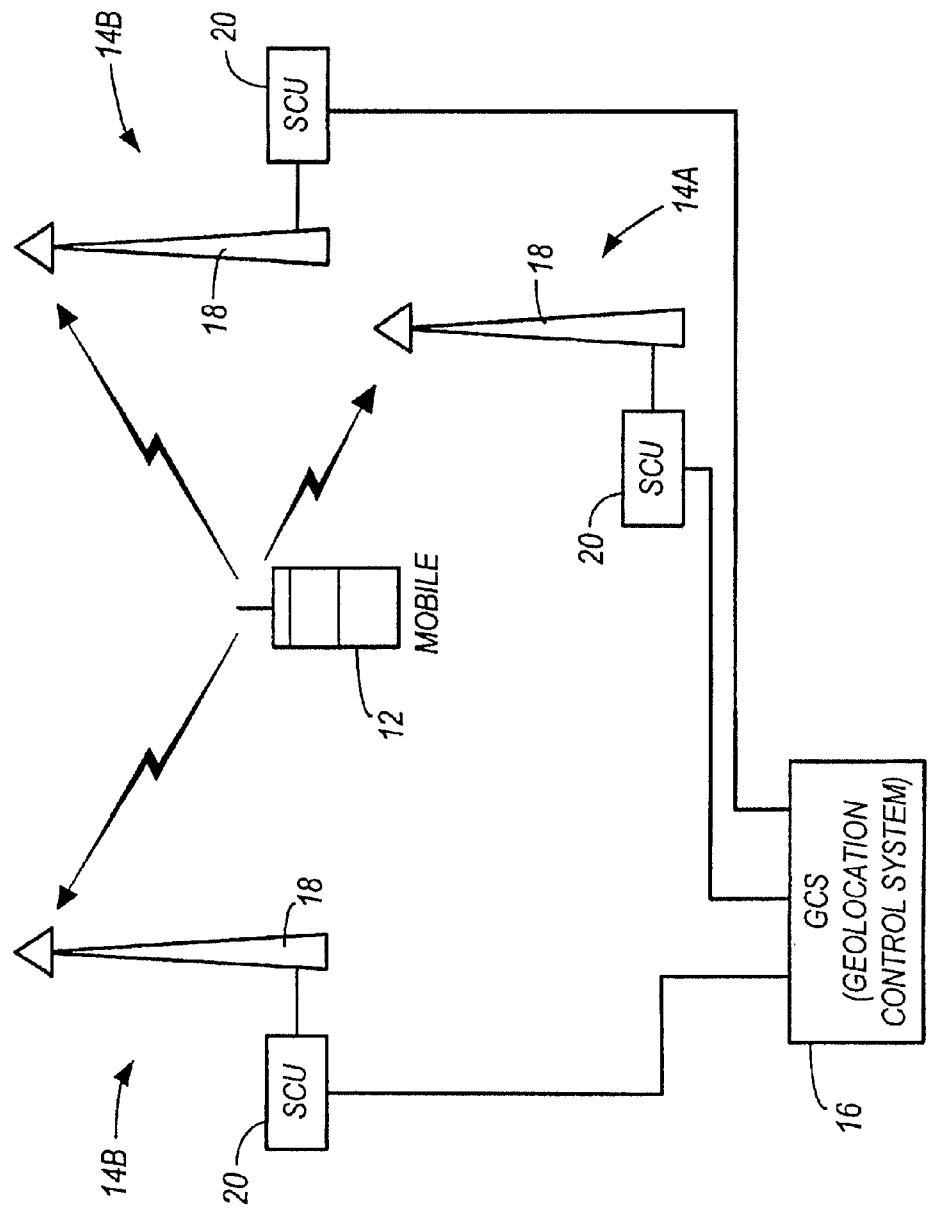
FIG. 1 is a schematic diagram of a CDMA geolocation system according to the present invention.
Figure 2:
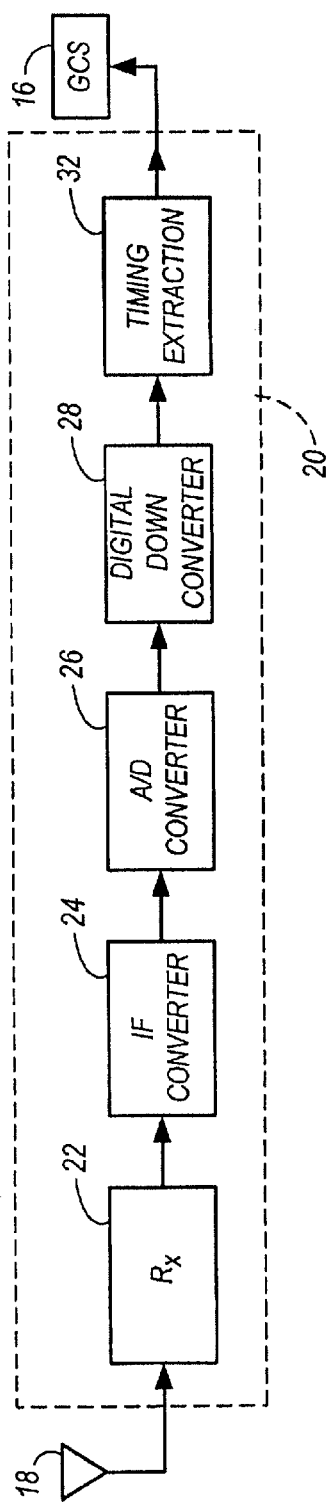
FIG. 2 is a schematic block diagram of a signal collection unit (SCU) of FIG. 1.
Figure 4:
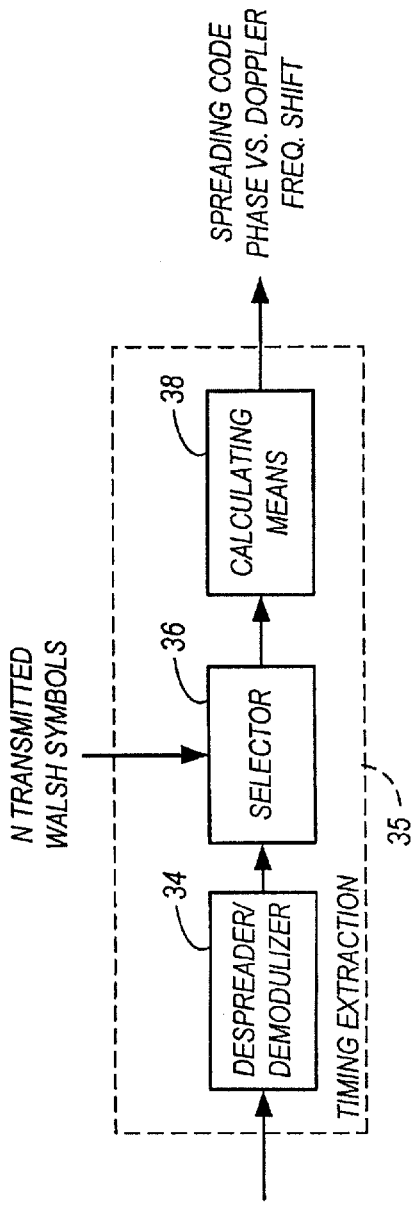
FIG. 4 is a schematic block diagram of the extractor means section of FIG. 3.

In accordance with the present invention, a CDMA geolocation system for providing geolocation of a mobile transceiver capable of spread spectrum coded radio frequency emission and communication, such as a CMDA system, is described that provides distinct advantages when compared to those of the prior art. A method is also described for extracting information necessary for geolocation of low power CDMA signals without the need for modification of the CDMA air standard or mobile transceivers. From this information, intersecting geometric surfaces derived from time of arrival measurements of spread spectrum coded radio frequency emission may be used to calculate the geolocation of a mobile transceiver. The invention can best be understood with reference to the accompanying drawing figures.

Referring now to the figures, a geolocation system according to the present invention includes at least one mobile CDMA transceiver 12, a plurality of base stations 14A, 14B for receiving spread spectrum coded radio frequency emissions and a geolocation control system (GCS) 16.

As used herein, the term mobile transceiver is intended to be synonymous with the term remote transceiver, namely a transceiver remote from base stations, which transceiver may be portable or movable, as well as those which may be stationary, as for office use. In the preferred embodiment the geolocation system operates with a CDMA communication system having mobile transceivers 12 and base stations 14A, 14B which are operable in CDMA mode. Other systems capable of operation in a spread spectrum coded radio mode may be used as well.

Each base station 14A, 14B comprises at least one transmitter and at least one receiver with an antenna 18 coupled thereto. Each base station 14A, 14B further comprises a signal collection unit (SCU) 20 coupled to the base station antenna 18. The SCUs 20 may be co-located with the base stations 14 or may be located elsewhere.

Each SCU 20 is configured for collecting and storing spread spectrum coded radio frequency emission received by its corresponding base station 14A, 14B, synchronizing the collection times of the several base stations 14A, 14B, and for extracting information bits from orthogonal sequences of information bits, such as Walsh codes, by despreading/demodulating the received emissions. The extracted Walsh codes are sent to the GCS 16, which determines the primary base station 14A, which is the base station maintaining active communication with the mobile tranceiver 12. The GCS 16 sends the extracted Walsh codes to secondary base stations 14B.

The SCUs 20 associated with the secondary base stations 14B use the extracted Walsh codes sent by the GCS 16 to extract time of arrival information from the spread spectrum coded radio frequency emissions stored at each SCU 20. The time of arrival information is extracted by combining portions of the received spread spectrum coded radio frequency emissions, that have been identified as containing the Walsh codes of interest. Because the Walsh codes of interest are known, the SCUs 20 at the secondary base stations 14 can coherently integrate via fast Fourier transform over a long period of time to increase gain allowing the SCUs 20 to extract time of arrival information from low power spread spectrum coded radio frequency emissions received by the secondary base stations 14B. Furthermore, the integration time can be dynamically changed based on the integration needed to achieve accurate time of arrival information.

The SCUs 20 receive, digitize and store spread spectrum coded radio frequency emissions from the mobile transceivers 12. The SCUs 20 also determine time of arrival information for the spread spectrum coded radio frequency emissions received at the base stations 14A, 14B and transmit the time of arrival measurements to the GCS 16 for calculation of the geolocation of the mobile transceiver 12. Because the SCUs 20 store the spread spectrum coded radio frequency emissions, such as in Random Access Memory, the emissions can be processed ex post facto to extract time of arrival information.

In a preferred embodiment, each SCU 20 comprises a receiver 22, having an IF converter 24 for converting the received spread-spectrum coded radio frequency emission to an IF signal, an A/D converter 26 for digitizing the IF signal, a digital down converter 28 for mixing the digitized IF signal to baseband for processing, and timing extraction means 32 for extracting the time of arrival information of the spread spectrum coded radio frequency emission received at the base station 14A, 14B. The timing extraction means 32 includes divider means 29 for dividing the mixed baseband signal into M identical processing stages 31 and extractor means 35 for extracting the time of arrival information.

The extractor means 32 comprises despreader/demodulator means 34, a selector 36 and calculating means 38. The despreader/demodulator means 34 despreads/demodulates the spread spectrum coded radio frequency emission and to extract Walsh codes from the signal. The selector 36 selects the Walsh codes of interest from the extracted Walsh codes. The calculating means 38 calculates the P-point fast Fourier transform of each of the M processing stages 31.

The geolocation system further comprises synchronizing means for providing a time standard, desirably a GPS time standard such as that which is described in U.S. Pat. No. 5,317,323, for synchronizing the SCUs 20, the GCS 16 and the mobile transceiver 12 in time. In the preferred embodiment, the SCUs 20, and the GCS 16 include a GPS receiver 21, such as part #36204-61 from Trimble Navigation, 845 North Mary Avenue, P.O. Box 3642, Sunnyvale, Calif. 94088, that is used to maintain a common timebase between these geographically separated sites.

The GCS 16 is configured to repeatedly poll each SCU 20. The SCUs 20 are configured with two different modes of operation. A first mode of operation is used by the SCU 20 associated with the primary base station 14A. When polled by the GCS 16, an SCU 20 operating in the first mode of operation despreads/demodulates the received spread spectrum coded radio frequency emission into Walsh codes, and routes the Walsh codes to the GCS 16. Preferably, forward error correction is exploited in order to minimize the number of bit errors.

Any routing mechanism may be used for communication between the GCS 16 and the SCUs 20, such as ISDN or DSO digital trunk lines. In addition, the SCU 20 performs time of arrival measurements on the spread spectrum coded radio frequency emission received by the primary base station 14A.

The SCUs 20 include means for determining the time of arrival of spread spectrum coded radio frequency emissions referenced to the GPS timing reference. When three or more SCUs 20 are used, difference in the times of arrival at the SCUs 20 may be used to estimate the mobile transceiver 12 location. This is done by calculating the intersection of hyperbola branches that define the two-dimensional surface along which the mobile transceiver 12 may lie. Each pair of time differences defines a hyperbola branch, and thus three or more SCUs 20 will generate two unique hyperbola branches that will intersect in one location. When more than three SCUs 20 are used, standard least-squares optimization techniques may be used to solve an overdetermined system of equations that will produce a most probable estimate of the mobile transceiver 12 location.

Alternatively, a method in which a location may be estimated using only two SCUs 20 is possible by an additional measurement of the spread spectrum coded radio frequency emission from the base stations 14A, 14B. In the CDMA air standard IS-95, the mobile transceiver 12 is required to synchronize its timing to the base stations 14A, 14B. By measuring both the spreading code timing of the base station emissions and the mobile transceiver emissions, the round trip propagation time may be estimated. A "range ring" is produced by multiplying the round trip propagation time by the speed of light and dividing by two. Two adjacent range rings will intersect in one or two locations, depending on the location of the mobile transceiver 12, thus potentially providing a location estimate with one ambiguity. The location ambiguity may be resolved through knowledge of the transmitting base station sector or other a-piori knowledge of the cell-site geometry.

The GCS 16 includes means for identifying Walsh codes of interest in the spread spectrum coded radio frequency emission received at the base station 14A, 14B, and determination means for determining the time of arrival of the spread spectrum coded radio frequency emission at the base station 14A, 14B. The GCS 16 routes the despread/demodulated Walsh codes it receives from the primary base station 14A to each of several other surrounding SCU's 20 at secondary base stations 14B in the proximity of the primary base station 14A. These SCUs 20 operate in the second mode of operation. Upon receiving the despread/demodulated Walsh codes from the GCU 16, these SCUs 20 perform time of arrival measurements based on the mobile transceiver's 12 spreading code, and report the results to the GCS 16. Because of power level limitations associated with CDMA signals, the signals at these surrounding SCUs 20 may be very weak, making the time of arrival measurements prone to significant error. Thus, steps must be taken to make the geolocating of the mobile transceiver 12 more accurate.

The SCUs 20 are configured to improve the timing measurements of weak CDMA signals. In operation, a receiver 22 receives spread spectrum coded radio frequency emissions from the base station antenna 18. The received spread spectrum coded radio frequency emissions are converted into intermediate frequency (IF) signals by the IF converter 24 and the IF signals are digitized by the A/D converter 26 (such as Analog Devices AD 9042 available from Analog Devices, One Technology Way, P.O. Box 9106, Norwood, Mass. 02062). The digitized signal is mixed with a baseband signal by the digital down converter 28 (available from Harris, 1503 South Coast Dr., Suite 320, Costa Mesa, Calif. 92626). In this manner, the spread spectrum coded radio frequency emission is prepared for processing while maintaining high dynamic range and uniformity between the SCUs 20.

The down converted signal is sent to timing extraction means 32, which is configured to extract spreading code time of arrival information from the spread spectrum coded radio frequency emission received by the base station 14A, 14B. The timing extraction means 32 comprises divider means 29 and extractor means 35. The down converted signal is divided into M identical processing stages 31 by the divider means 29 and timing extraction is performed on each of the M processing stages 31 by the extractor means 35 to extract the time of arrival of the spread spectrum coded radio frequency emission. The divider means 29 and extractor means 35 may comprise a software operated microprocessor running an appropriate software algorithm.

Each stage 31 performs despreading/demodulating at over sampled chip offsets. In one embodiment, a one-half chip offset from the next processing stage 31 is used. This is done because the chip timing is unknown until sufficient integration time can reveal a peak in the time-frequency cross ambiguity function. The uncertainty in timing is a function of the unknown propagation distance, and thus determines the number of stages M. To find a suitable value for M, the maximum expected-propagation time must be estimated. From this, the number of chip offset stages over which to search may be determined as follows:

$$M = \frac{(2d/c)}{Tc} * N$$

Tc=Chip Duration (seconds)
c=speed of light ($3*10^8$ m/s)
d=maximum expected propagation distance (meters)
N=chip over sampling rate The IS-95 CDMA standard specifies the use of orthogonal Walsh codes to represent one of sixty-four possible six bit transmitted data sequences. Each sixty-four element Walsh code is known as a Walsh symbol. Since the transmitted data is available to all SCUs 20, the transmitted Walsh codes are also known. This allows the timing extraction means 32 to use relatively long integration times to increase the gain, thereby allowing time of arrival information to be extracted from low power spread spectrum coded radio frequency emissions received at the secondary base stations 14B.

Figure 3:
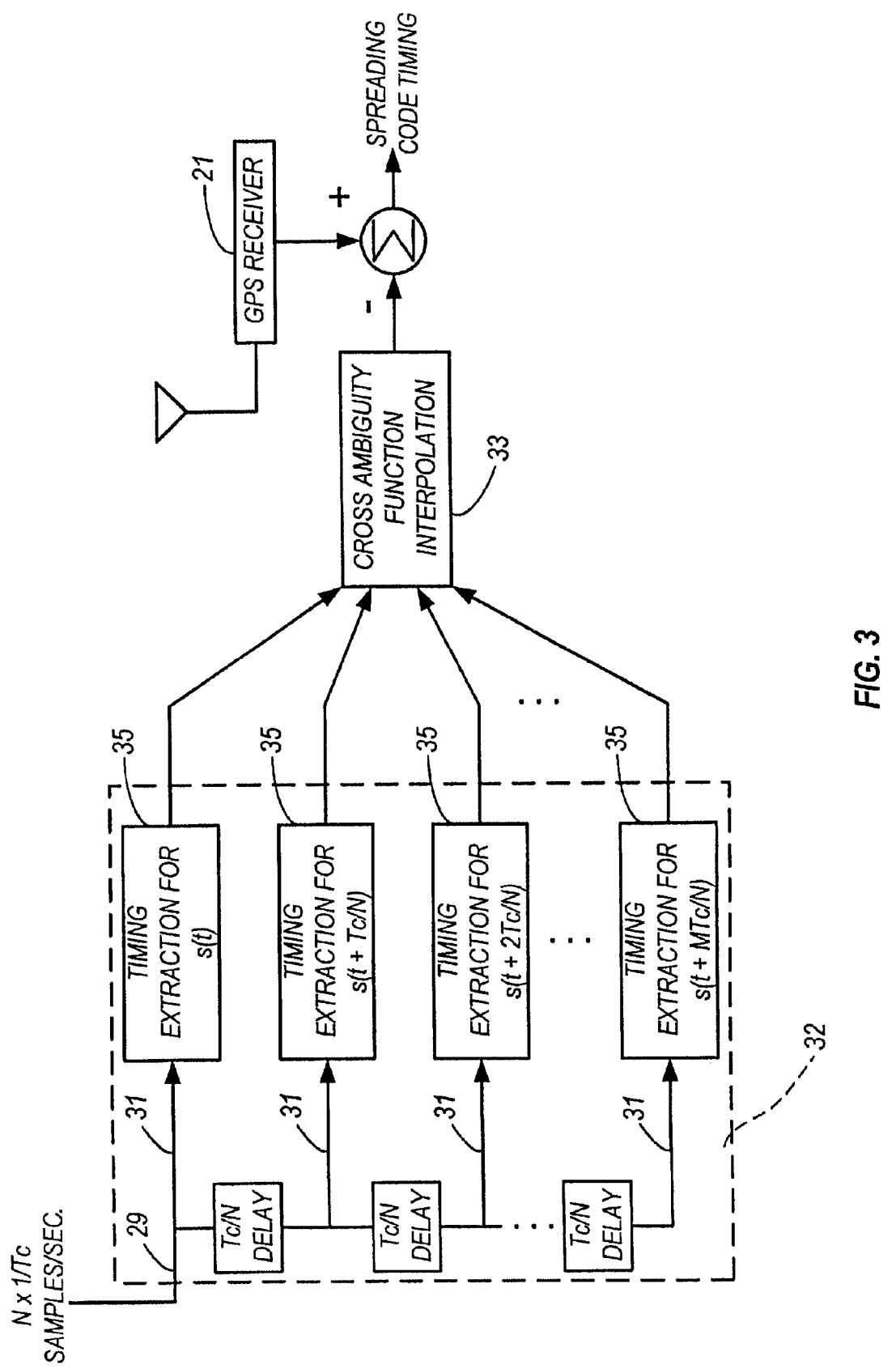
FIG. 3 is a schematic block diagram of the timing extraction means of FIG. 2.

As shown in FIG. 3, the despreader/demodulator means 34 despreads/demodulates the spread spectrum coded radio frequency emission to separate out the Walsh codes. The despreader/demodulator means may be implemented in a digital signal processor in software as in accordance with the description in *Foundations of Mobile Radio Engineering*, Yacoub, CRC Press, 1993, pp. 405–7. The selector 36 selects the Walsh codes that correspond to the known transmitted Walsh codes, as specified by the SCU 20 associated with the primary base station 14A, and the calculating means 38 calculates the P-point fast Fourier transform of the M stages, where P is the total number of Walsh codes to be coherently integrated. The extractor means 35 at each stage 31 of the timing extraction means 32 provides time dimension information and the Fourier transformed output reveals frequency content. The effect is to generate a two dimensional time versus frequency cross ambiguity function 33. The peak of this function may be interpolated to create an accurate estimate of the time of arrival of the spread spectrum coded radio frequency emission received by the secondary base stations 14B.

Doppler frequency shifts of the spread spectrum coded radio frequency emission tend to and can occur as the carrier signal of the spread spectrum coded radio frequency emission varies over time due to mobile transmitter motion. In addition, frequency offsets may exist due to either transmitter and receiver tuning frequency mismatches. Ordinarily this would not be of concern since integration periods in a typical receiver are generally very short in duration. However, integration time in the SCUs 20 could possibly extend up to several seconds in order to provide the needed gain. Thus, frequency shifts must be taken into consideration. Compensation for the frequency shifts inherent in the operation of the system of the present invention is provided.

The P-point fast Fourier transform calculated by the calculating means 38 is used to isolate the maximum correlation peak in both time and frequency. Each identical processing stage 31 provides the time dimension information and the Fourier transformed output reveals the frequency content. This can be thought of as a time-frequency cross ambiguity function that effectively provides immunity to both doppler and other frequency shifts, and preserves the time of arrival information throughout the Fourier transformed stages.

In the case of a sufficiently high signal to noise ratio, the received correct Walsh codes become apparent because the Walsh codes whose magnitude are the largest of the sixty-four Walsh codes are the correct Walsh codes. In the case where the signal is very weak or the signal to noise ratio is low, it may be difficult to discern the correct Walsh codes. Thus, the invention exploits the fact that the Walsh codes are known to the system, and the system retains only those Walsh codes corresponding to the signal of interest. The effective gain of such a system is $10 \times \log_{10}(N)$, and is roughly equivalent to boosting the mobile transceiver power or lowering the receiver noise floor.

The time of arrival timing measurements are made relative to the absolute time of day given by a highly stable reference such as GPS. All SCUs 20 perform the above timing measurements relative to the common timebase and report the results back to the GCS 16 for calculation of the geolocation of the CDMA mobile transceiver 12.

The function of the GCS 16 is to poll each SCU 20 to perform data collections for timing measurements, as well as to calculate the geolocation of the mobile transceiver 12. Typically, the GCS 16 comprises a programmable computer. Geolocations of mobile transceivers 12 may be found with timing measurements from as few as two SCUs 20. However, a point of ambiguity in the location is generated with only two sets of timing measurements. Geolocations can be determined using conventional triangulation techniques when three sets of timing measurements are available. When more than three sets of timing measurements are available standard least squares numerical techniques for solving systems of overdetermined equations may be used to determine the geolocation of the mobile transceiver 12.

Figure 5:
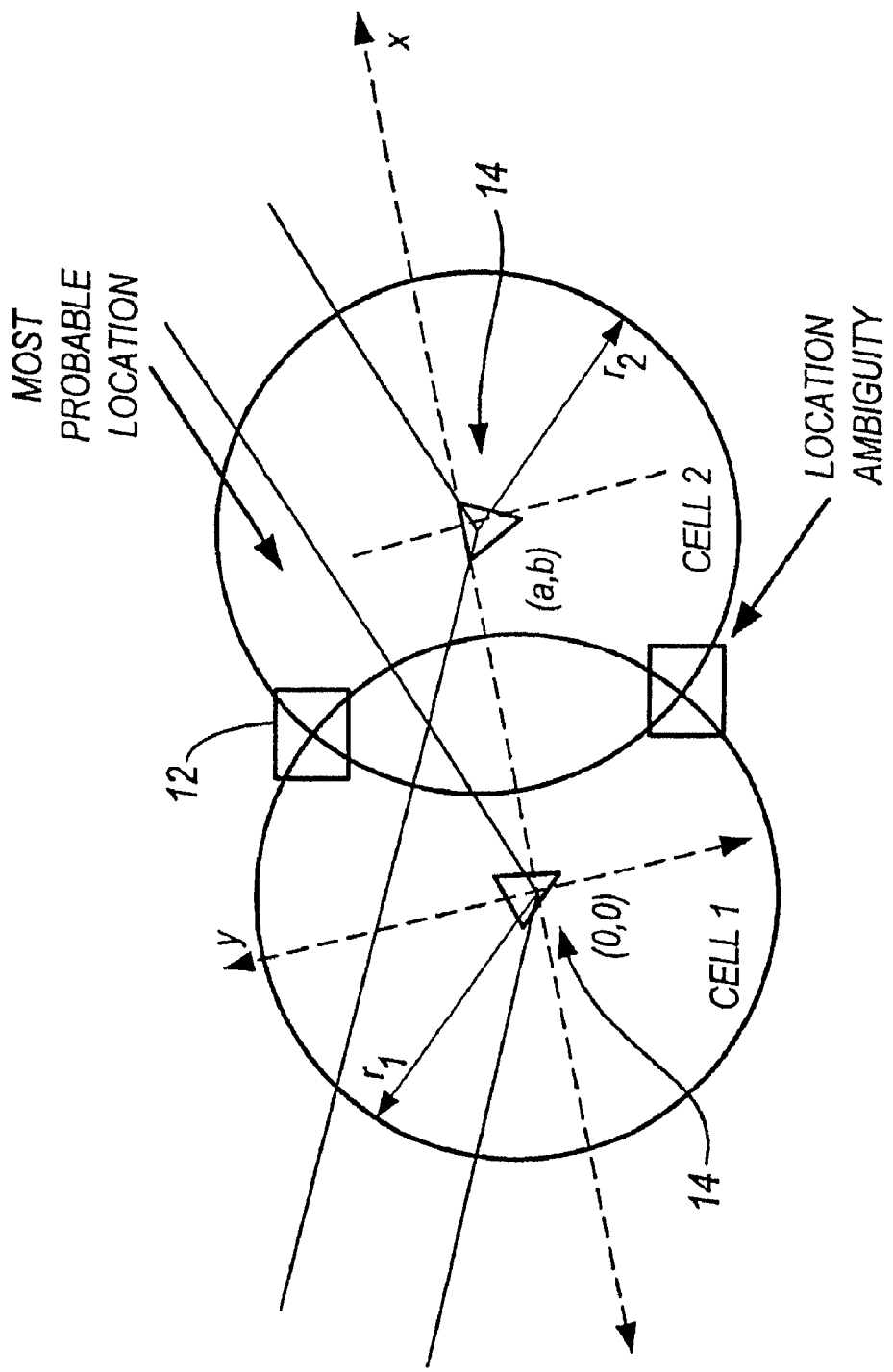
FIG. 5 is a schematic diagram illustrating a technique according to the present invention for geolocating a CDMA mobile transceiver using only two base stations.

As shown in FIG. 5, in order to determine the geolocation of a mobile transceiver 12 with only two sets of timing measurements, the point of ambiguity must be resolved. Since most base stations 14 are sectored into three sectors, one hundred and twenty degree areas of coverage each, the correct location can be chosen based on which sector is active. The received power is highest in the sectors facing the mobile transceiver 12. Thus, the active sector can easily be determined and the point of ambiguity resolved.

The geolocation of a mobile transceiver 12 may be estimated as the intersection of two range rings about two base stations 14. The range rings may be derived from time of arrival measurements as follows:

$r_1 = v(t1-t0)/2$ $r_2 = [t2-t0) \times c] - r1$ $c$ = speed of light ($3 \times 10^8$ m/s)

where t0 is the time of transmission (measured spreading code timing at the base station 14) and t1 and t2 are the received times of arrival at the two base stations 14.

Using the coordinate system shown in FIG. 5, the position solution may be found using the following equations:

$$\bar{y} = \frac{4b\gamma \pm \sqrt{16b^2\gamma^2 + 16(a^2+b^2)(4a^2 r_1^2 - \gamma^2)}}{-8(a^2+b^2)}$$

$$\bar{x} = \pm \sqrt{r_1^2 - \bar{y}^2}$$

$$\gamma = (r_2^2 - r_1^2 - a^2 - b^2)$$

(a,b)=x and y coordinates of second base station (first base station is at the origin)

$(\bar{x}, \bar{y})$=estimated position of mobile transceiver $r_1$=range from first base station $r_2$=range from second base station Alternatively, when three or more SCUs 20 are used, the mobile transceiver location may be estimated with no ambiguities. Rather than measuring both the times of arrival of the mobile transceiver and base station emissions, only the times of arrival from the mobile transceiver are needed. Range difference are defined as follows:

$rd_{ij} = c(toa_i - toa_j)$ $rd_{ij}$=range difference between base station i and j c=3e8 m/s (speed of light)

$toa_i$=time of arrival of emission at base station;

$toa_j$=time of arrival of emission at base station;

Combining range differences between three or more SCUs 20 will reveal multiple hyperbola branches in which the intersection is the most likely position of the mobile transceiver 12. Each range difference hyperbola branch defines a geometric surface in which the two participant base stations 14 are the focal points of the hyperbola branch, and the mobile transceiver 12 position lies at some point on the branch. Interpretation of these multiple hyperbola branches and techniques for solving for the most probable estimate may be found in "Statistical Theory of Passive Location Systems", Don Torrieri, IEEE Transactions on Aerospace and Electronic Systems, pp. 183–198, March, 1994.

Figure 6:
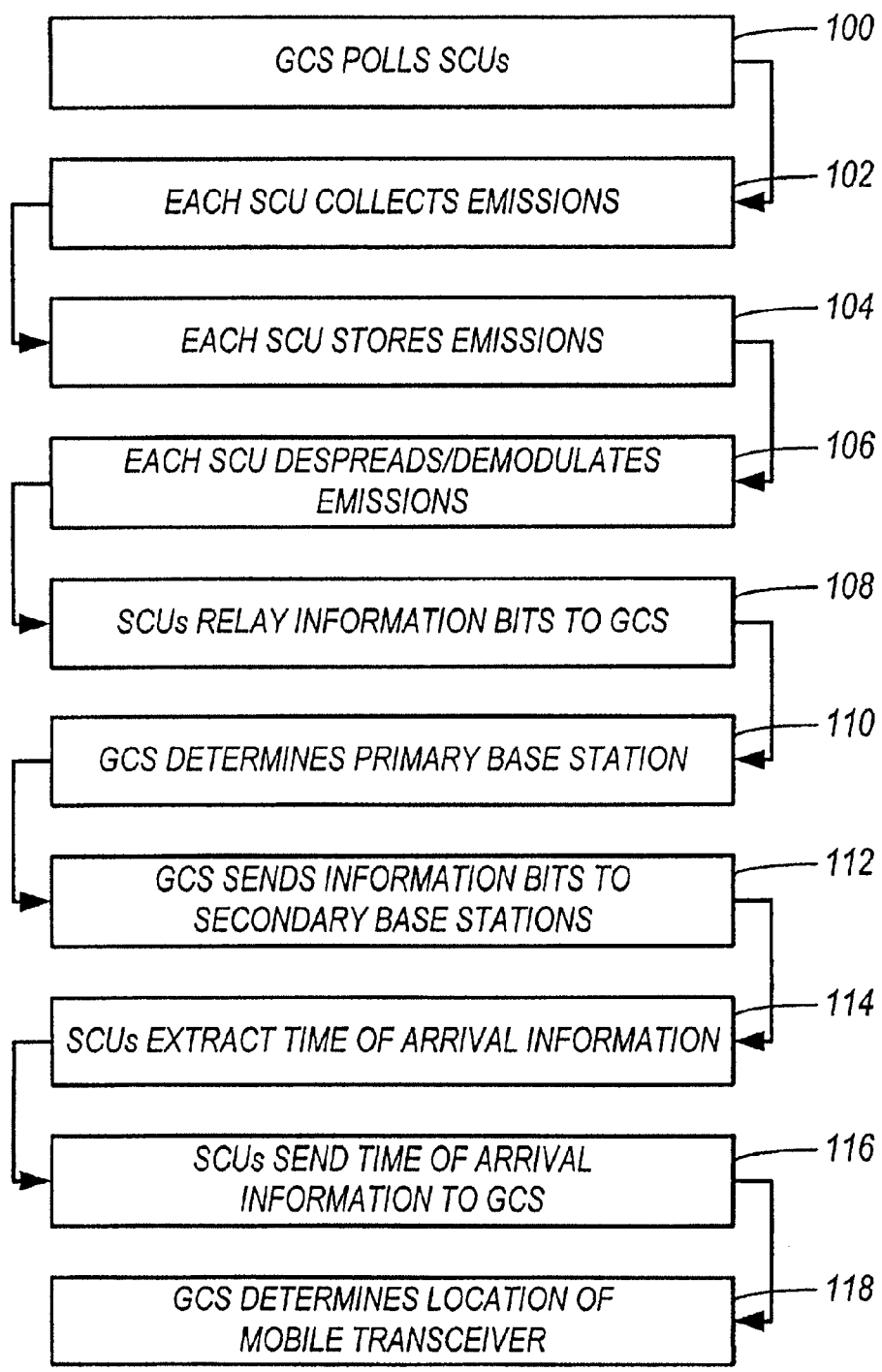
FIG. 6 is a block diagram of a method for determining the geolocation of a CDMA mobile transceiver according to the present invention.

Referring now to FIG. 6, in step 100 of the method of operation according to the present invention, the GCS 16 polls the SCUs 20. In step 102, each SCU 20 received and collects a spread spectrum coded radio frequency emission, such as a CDMA signal, from a mobile transceiver 12, at selected time intervals on common RF channels. The spread spectrum coded radio frequency emissions are stored at each SCU 20 in step 104. The collection times are synchronized by a common time base, such as a GPS. The SCUs 20 despread/demodulate the stored signals in step 106 and extract Walsh codes from the stored emission and send and relay them to the GCS 16 in step 108. From this information, the GCS 16 determines the primary base station 14A in step 110 and sends Walsh codes of interest to the secondary base stations 14B in step 112 without re-encoding the information to make efficient use of bandwidth. In essence, the secondary base stations 14B use the Walsh codes of interest to perform a joint time-frequency search in step 114 to extract time of arrival information from the spread spectrum coded radio frequency emission received at each of the secondary base stations 14B. The time of arrival information is sent back to the GCS 16 in step 116. With the time of arrival information from several base stations 14A, 14B, the GCS 16 determines the geolocation of the mobile transceiver 12 using conventional geolocation techniques in step 118.

It will be apparent to those skilled in the art that modifications may be made without departing from the spirit and scope of the invention. Accordingly, it is not intended that the invention be limited except as may be necessary in view of the appended claims.

What is claimed is:

1. A geolocation system for providing geolocation of a mobile transceiver capable of spread spectrum coded radio frequency emissions and communication, said geolocation system comprising:

a plurality of base stations comprising a primary base station and one or more secondary base stations for receiving the spread spectrum coded radio frequency emissions, the primary base station being in communication with the mobile transceiver and the secondary base stations for conveying selected coded information bits from the mobile transceiver to the secondary base stations via the primary base station;

means for synchronizing the plurality of base stations to the mobile transceiver in time;

means for determining the geolocation of the mobile transceiver based on times of arrival of the spread spectrum coded radio frequency emissions at the plurality of base stations;

wherein each of the plurality of base stations comprises:
means for identifying a signal of interest in a spread spectrum coded radio frequency emission received at the base station, a portion of the signal of interest including the selected coded information bits conveyed from the mobile transceiver to the secondary base stations via the primary base station;
means for determining a time of arrival of the spread spectrum coded radio frequency emission received at the base station;

and wherein said means for determining the time of arrival of the spread spectrum coded radio frequency emission received at the one or more secondary base stations comprises:
means for dividing the spread spectrum coded radio frequency emission received at the one or more secondary base stations into a plurality of stages as a function of an estimated propagation distance;
despreader/demodulator means for despreading/demodulating each of the plurality of stages into the selected coded information bits; and
calculating means for calculating the fast Fourier transform of each of the plurality of stages to produce a time-frequency cross ambiguity function to filter and isolate strongest peak.

2. The geolocation system of claim 1 further comprising a geolocation control system for determining a primary base station from the plurality of base stations, the primary base station being in active communication with the mobile transceiver.

3. The geolocation system of claim 2 wherein the geolocation control system further comprises means for routing said identified information bits of interest from the primary base station to secondary base stations, the secondary base stations comprising all of the plurality of base stations except the primary base station.

4. The geolocation system of claim 3 wherein upon receiving the routed identified information bits of interest, each of the secondary base stations is configured for using the routed identified information bits of interest for identifying the information bits of interest in the spread spectrum coded radio frequency emission received at the secondary base station.

5. The geolocation system of claim 4 wherein the means for determining time of arrival in each of the secondary base stations further comprises despreader/demodulator means for despreading/demodulating each of the plurality of stages into the plurality of information bits at over sampled chip offsets.

6. The geolocation system of claim 1 wherein said means for dividing divides the spread spectrum coded radio frequency emission into M stages wherein:

$$M = \frac{(2d/c)}{Tc} * N$$

Tc=Chip Duration (seconds)
c=speed of light ($3*10^8$ m/s)
d=maximum expected propagation distance (meters)
N=chip over sampling rate.

7. The geolocation system of claim 1 further comprising means for interpolating a selected peak in the time-frequency cross ambiguity function for determining the time of arrival.

8. The geolocation system of claim 1 wherein the means for identifying information bits of interest from the spread spectrum coded radio frequency emission received at the base station comprises means for extracting information bits from the spread spectrum coded radio frequency emission received at the bast station, each information bit having an amplitude; and means for identifying the information bit having the largest amplitude.

9. The geolocation system of claim 2 wherein said geolocation control unit includes means for instructing each of the base stations to store spread spectrum coded radio frequency emissions received at the base station.

10. The geolocation system of claim 1 wherein each of the base stations is divided into a plurality of sectors, each sector being capable of receiving a spread spectrum coded radio frequency emission from the mobile transceiver, the geolocation system further comprising means for determining which sectors of the base stations receives the spread spectrum coded radio frequency emission.

11. The geolocation system of claim 10 wherein a spread spectrum coded radio frequency emission is received by each of a first base station and a second base station, each of the first and second base stations having position coordinates and the first base station being designated the origin, such that the estimated position of the mobile transceiver is determined as follows:

$$\tilde{y} = \frac{4b\gamma \pm \sqrt{16b^2\gamma^2 + 16(a^2+b^2)(4a^2r_1^2 - \gamma^2)}}{-8(a^2+b^2)}$$

$$\bar{x} = \pm\sqrt{r_1^2 - \bar{y}^2}$$

$$\gamma = (r_2^2 - r_1^2 - a^2 - b^2)$$

(a,b)=x and y coordinates of second base station (first base station is at the origin)

$(\bar{x},\bar{y})$=estimated position of mobile transceiver $r_1$=range from first base station $r_2$=range from second base station.

12. A method of ascertaining the geolocation of a mobile transceiver capable of spread spectrum coded radio frequency emissions and which is in communication with a plurality of base stations, said method comprising the steps of:

designating a primary base station and one or more secondary base stations from the plurality of base stations;

receiving spread spectrum coded radio frequency emissions from the mobile transceiver at the of primary base stations;

establishing the primary base station in communication with the mobile transceiver and the secondary base stations;

conveying selected coded information bits from the mobile transceiver to the secondary base stations via the primary base station;

synchronizing the plurality of base stations to the mobile transceiver in time;

extracting a signal of interest from a spread spectrum coded radio frequency emission received at each of the base stations;

determining the primary base station based on the extracted signal of interest and identifying a portion of the signal of interest including the selected coded information bits conveyed from the mobile transceiver to the secondary base stations via the primary base station;

forwarding the selected coded information bits of interest from the primary base station to the secondary base stations, the secondary base stations comprising all of the plurality of base stations except the primary base station;

determining times of arrival of the spread spectrum coded radio frequency emission received at one or more of the secondary base stations;

determining a time of arrival of the spread spectrum coded radio frequency emission received at the primary base station;

determining the geolocation of the mobile transceiver utilizing the determined times of arrival.

13. The method of claim 12 wherein the step of determining the times of arrival of the spread spectrum coded radio frequency emission received at each of the secondary base stations further comprises the steps of:

dividing the spread spectrum coded radio frequency emission received at each of the secondary base stations into a plurality of stages;

despreading/demodulating each of the plurality of stages into the extracted information bits;

calculating the fast Fourier transform of each of the stages to produce a time-frequency cross ambiguity function; and determining the times of arrival of the spread spectrum coded radio frequency emission received at each of the secondary base stations based on the time-frequency cross ambiguity function.

14. The method of claim 12 wherein the step of determining the geolocation of the mobile transceiver further comprises the steps of:

determining the ranges between the mobile transceiver and the plurality of base stations utilizing the determined times of arrival; and calculating the geolocation of the mobile transceiver based on the ranges between the mobile transceiver and the plurality of base stations.

15. The method of claim 13 further comprising the step of despreading/demodulating each of the plurality of stages into the extracted information bits at over sampled chip offsets for each of the secondary base stations.

16. The method of claim 13 wherein the step of dividing comprises dividing the spread spectrum coded radio frequency emission received at each of the secondary base stations into M stages wherein:

$$M = \frac{(2d/c)}{Tc} * N$$

Tc=Chip Duration (seconds)

c=speed of light ($3*10^8$ m/s)

d=maximum expected propagation distance (meters)

N=chip over sampling rate.

17. The method of claim 13 wherein the step of determining the times of arrival of the spread spectrum coded radio frequency emission received at each of the secondary base stations further comprises the step of interpolating a selected peak in the time-frequency cross ambiguity function and determining the times of arrival based on the selected peak.

18. The method of claim 12 wherein the step of identifying from the extracted information bits information bits of interest in the spread spectrum coded radio frequency emission received at each of the base stations further comprises identifying the extracted information bits having the largest amplitude.

19. The method of claim 12 wherein each of the plurality of base stations is divided into a plurality of sectors, each sector being capable of receiving a spread spectrum coded radio frequency emission from the mobile transceiver, the method further comprising the step of determining which sector of the base station receives the spread spectrum coded radio frequency emission.

20. The method of claim 19 wherein a spread spectrum coded radio frequency emission is received by each of a first base station and a second base station, each of the first and second base stations having position coordinates and the first base station being designated the origin, the method further comprising the step of estimating the position of the mobile transceiver as follows:

$$\tilde{y} = \frac{4b\gamma \pm \sqrt{16b^2\gamma^2 + 16(a^2+b^2)(4a^2r_1^2 - \gamma^2)}}{-8(a^2+b^2)}$$

$$\bar{x} = \pm\sqrt{r_1^2 - \bar{y}^2}$$

$$\gamma = (r_2^2 - r_1^2 - a^2 - b^2)$$

(a,b)=x and y coordinates of second base station (first base station is at the origin)

($\bar{x}$,$\bar{y}$)=estimated position of mobile transceiver $r_1$=range from first base station $r_2$=range from second base station.

21. The geolocation system of claim 1, wherein the primary base station of said plurality of base stations comprises the base station closest to the mobile transceiver and in communication therewith for conveying the selected coded information bits to the secondary base stations.

22. The geolocation system of claim 1, wherein the primary base station is in communication with the secondary base stations for conveying Walsh symbols as the selected coded information bits from the mobile transceiver to the secondary base stations via the primary base station.

23. The geolocation system of claim 22, where the selected coded information bits are Walsh symbols, and wherein the coded information extraction at the primary site comprises a Walsh Transform.

24. The geolocation system of claim 1, wherein the means for determining time of arrival comprises extractor means for extracting the signal of interest from the spread spectrum coded radio frequency emission received at each of the base stations wherein the divider means divides each emission into M identical processing stages for timing extraction performed on each of the processing stages by the extractor means to jointly extract the signal of interest and time of arrival of the spread spectrum coded radio emission.

25. The geolocation system of claim 24, where the selected coded information bits are Walsh symbols, and wherein the coded information extraction at the primary site comprises a Walsh Transform.

26. The geolocation system of claim 24, where the selected coded information bits are Walsh symbols, and wherein the timing extraction comprises joint multistage time domain correlation, frequency domain and Walsh transforms to extract the timing of arrival information.

27. The geolocation system of claim 24, wherein the despreader/demodulator means operates over each of the M identical processing stages at oversampled chip offsets.

28. The geolocation system of claim 27, wherein the despreader/demodulator means comprises an interpolation for timing extraction in a time-frequency cross ambiguity function.

29. The geolocation system of claim 28, wherein the despreader/demodulator means uses a one-half chip offset.

30. The geolocation system of claim 28, wherein the extractor means provides time dimension information and further comprises a frequency domain transform to separate frequency content to enhance time information accuracy.

31. The geolocation system of claim 28, wherein the frequency transform function comprises a P-point fast Fourier transform.

32. The geolocation system of claim 30, wherein the time-frequency cross ambiguity function provides immunity to doppler frequency domain shifts to preserve the time of arrival information throughout the frequency domain transform stages.

* * * * *